(12) United States Patent
Smith et al.

(10) Patent No.: US 11,437,790 B2
(45) Date of Patent: Sep. 6, 2022

(54) GRIPPING CABLE HANGER AND METHOD OF USING

(71) Applicant: Cambria County Association for the Blind and Handicapped, Johnstown, PA (US)

(72) Inventors: Allen Garrett Smith, Johnstown, PA (US); Frank Edward Hodge, Portage, PA (US); David James Prasko, Hastings, PA (US); Timothy Joseph Wedding, Johnstown, PA (US)

(73) Assignee: Cambria County Association for the Blind and Handicapped, Johnstown, PA (US)

( * ) Notice: Subject to any disclaimer, the term of this patent is extended or adjusted under 35 U.S.C. 154(b) by 196 days.

(21) Appl. No.: 15/953,548

(22) Filed: Apr. 16, 2018

(65) Prior Publication Data

US 2018/0233888 A1     Aug. 16, 2018

Related U.S. Application Data

(63) Continuation of application No. 15/728,569, filed on Oct. 10, 2017, now Pat. No. 10,063,039, which is a continuation of application No. 15/149,098, filed on May 7, 2016, now Pat. No. 9,800,028, which is a continuation-in-part of application No. 14/556,117, filed on Nov. 29, 2014, now Pat. No. 9,722,405.

(51) Int. Cl.
*F16L 3/00* (2006.01)
*H02G 3/04* (2006.01)
*F16L 3/223* (2006.01)
*F16L 3/02* (2006.01)
*H02G 3/30* (2006.01)

(52) U.S. Cl.
CPC .................. *H02G 3/04* (2013.01); *F16L 3/02* (2013.01); *F16L 3/223* (2013.01); *H02G 3/0443* (2013.01); *H02G 3/30* (2013.01)

(58) Field of Classification Search
CPC ................ H02G 3/32; H02G 3/30; F16L 3/14
USPC ..................................... 248/58, 61, 301, 303
See application file for complete search history.

(56) References Cited

U.S. PATENT DOCUMENTS

| | | |
|---|---|---|
| 499,549 A | 6/1893 | Hunter et al. |
| 1,609,052 A | 11/1926 | Blackburn |
| 1,720,746 A | 7/1929 | Povlsen et al. |
| 2,106,006 A | 1/1938 | Klein |
| 2,172,174 A | 9/1939 | Pierson |
| 2,210,722 A | 8/1940 | Klein |
| 2,384,440 A | 9/1945 | Carr |
| 5,788,201 A * | 8/1998 | Hardison ............... A01K 39/00 24/20 R |
| 5,957,416 A | 9/1999 | Sellati |
| D423,336 S * | 4/2000 | Gray .............................. D8/370 |
| 7,578,486 B1 | 8/2009 | Taylor |

(Continued)

*Primary Examiner* — Steven M Marsh
(74) *Attorney, Agent, or Firm* — Eckert Seamans Cherin & Mellott, LLC

(57) ABSTRACT

This invention has to do with a gripping cable hanger assembly system for the solar, mining, and electrical industry. The gripping cable hanger is comprised of a support wire gripping mechanism, cable carrier supports/receptacles, data carrier wire capability, space between said wire carriers with said wire comprising a shape retention material that may have a high dielectric, UV resistant coating thereon.

16 Claims, 15 Drawing Sheets

(56) References Cited

U.S. PATENT DOCUMENTS

| | | | | |
|---|---|---|---|---|
| 8,091,262 B2* | 1/2012 | Poulokefalos | ............ | G09F 3/14 |
| | | | | 40/661.05 |
| 8,147,102 B1 | 4/2012 | Townes | | |
| 9,706,859 B2* | 7/2017 | Brinton, Jr | ............. | A47B 96/02 |
| 2006/0060451 A1* | 3/2006 | Golias | .................... | B65G 17/20 |
| | | | | 198/465.4 |
| 2007/0090251 A1* | 4/2007 | Padden | ..................... | B60R 7/10 |
| | | | | 248/303 |
| 2011/0079427 A1* | 4/2011 | Powale | ................. | H01B 3/427 |
| | | | | 174/72 A |
| 2016/0153587 A1 | 6/2016 | Smith et al. | | |

\* cited by examiner

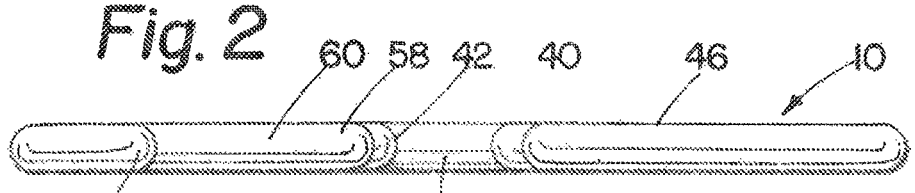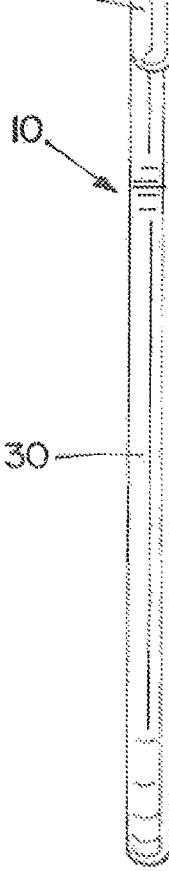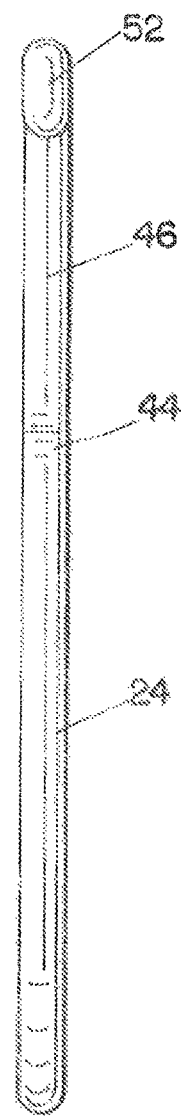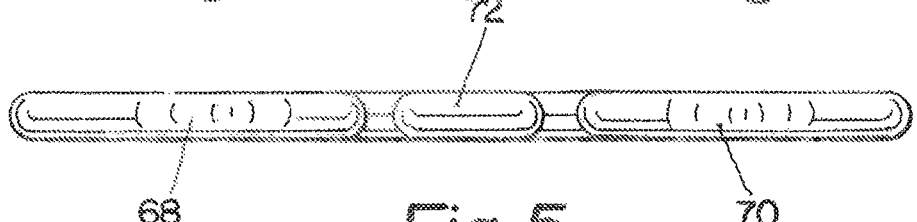

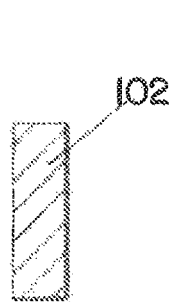 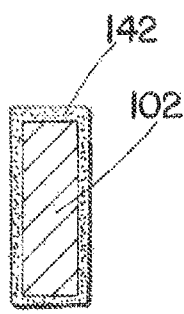 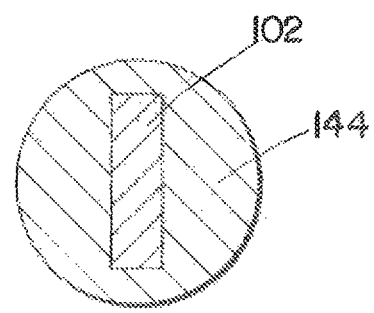
Fig.12A　　Fig.12B　　Fig.12C
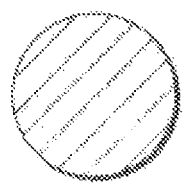 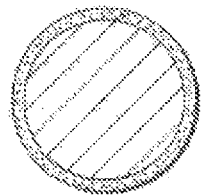 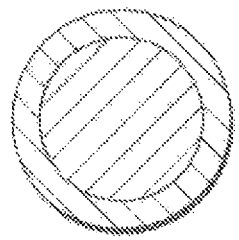
Fig.12D　　Fig.12E　　Fig.12F

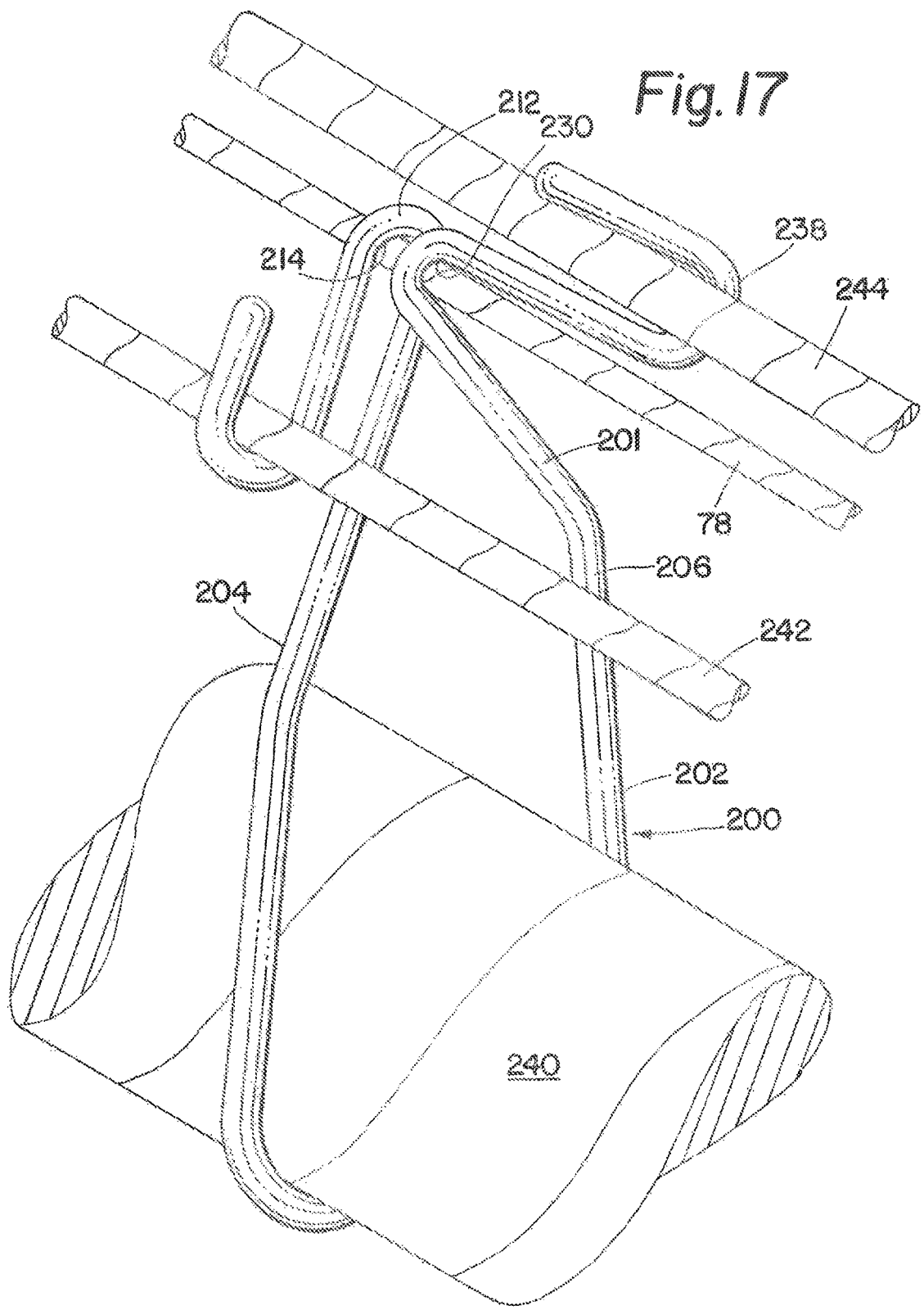

GRIPPING CABLE HANGER AND METHOD OF USING

CONTINUING APPLICATION DATA

This application is a continuation application of and claims priority to U.S. patent application Ser. No. 15/728,569, filed Oct. 10, 2017, which application is a continuation application and claims priority to U.S. patent application Ser. No. 15/149,098, filed May 7, 2016, now, U.S. Pat. No. 9,800,028, issued Oct. 24, 2017, entitled GRIPPING CABLE HANGER AND METHOD OF USING, which application is a Continuation-in-Part Application of U.S. patent application Ser. No. 14/556,117, filed on Nov. 29, 2014.

BACKGROUND OF THE INVENTION

This invention has to do with a gripping cable hanger system for use in the solar, mining, and electrical industries. In solar, mining, and electrical industries there is a need for electrical cables to extend from a power or signal source to a location of application. Such cables are usually indirectly connected and supported by an independent, structurally supported messenger wire that is strung along the planned cable route. Solar plants comprise large arrays of solar panels spread out over a large area. Solar panels collect the sun's rays causing a direct current to flow to direct current wires that are attached to the solar panels and then the current flows to combiner boxes before extending further to power inverters. Along the same messenger wire alternating current power cables are used to power the motors that control the trackers, devices that rotate the solar panels to follow the sun in order to obtain maximum power during daylight hours.

Prior to 2014, AC and DC cables could be bundled immediately adjacent to, and touching, one another in a wire management system for the solar panels. In the new National Electric Code of 2014, the AC and DC cables must not be immediately adjacent to one another, but must have a degree of separation from one another. Power carrying cables have a tendency to induce errors or interfere with the signal wires that are located in close proximity to them.

This new requirement also applies to other applications outside the solar power industry, such as the mining and electrical industries.

Because of the increased use of trackers in solar power plants, there is increased use of category five cables and other data wiring. This type of control wiring is used to give power plant operators feedback from the solar power plant array on what angles the panels are stationed, and what the proper angle should be to maximize power output from the sun. This data and information is constantly monitored to obtain maximum power output from the thousands of solar panels in the solar power plant. The type of wiring used in collecting data is sensitive to cables used for AC and DC power and because of that sensitivity, data wiring cannot be bundled with power cables and must be supported by a separate carrier that is at least 1 inch away from all power cables.

In solar power plants, mining and other electrical applications, there are various sized wires and bundles of wires with an almost unlimited variety of wire bundle sizes. Bundle size is becoming very important in the manufacture of hangers to accommodate these various sizes, especially in multiple carrier hangers.

In the past, cable hangers had small open loops or modified open loops for partial attachment to a messenger while loading the cables onto the hangers and the open loops allowed the partially hung hangers to easily fall off the messenger wire if the hangers were bumped or hit the wrong way during the cable loading process. In a solar plant there is a recent move to tracker systems which utilize more wiring than previously fixed, in place, systems and there is also the new NEC code which went into effect Jan. 1, 2014, which states that all AC and DC wiring must now be separated in any hanging or support system. Because of these changes, the wire management systems are much more complex, especially given the vast number of wires involved in a utility scale solar power plant. With these changes, the hangers are initially installed on the messenger wire and the bundles of cables are loaded separately in the carrier or carriers of the hanger. This process continues until all individual cables and bundles of cables are supported in the hangers. In the process of loading cables, the hangers are constantly bumped and jostled as they are loaded with bundles of cables. Prior styles of hangers that might have been used could easily fall off the messenger wire when bumped if only hanging by one open loop during cable installation.

The new NEC code requires any cable support system to have supports that are spaced at no greater than 30 inch intervals. This applies to cable trays, hangers or all other types of cable support systems. The prior hangers with their open style loops can fall off easily during installation and also could easily slide out of the desired 30 inch spacing when loading the cables. This is a more serious problem when you consider that there are tens of thousands of hangers being installed in the desert heat which can reach 120° F. Any wasted labor is a high additional cost in this environment.

A major factor affecting labor costs during installation of cables is how easily the electrician can load the cables and bundles of cables in the hangers in the stifling heat of the desert where solar power plants are usually located. Styles of cable hangers presently on the market can easily swing from side to side as they are initially engaged and suspended on the messenger wire requiring an electrician to take one hand and properly align the hanger in a 90° perpendicular orientation to the messenger wire in order to load the cables or bundles of cables in the hanger with the other hand. This two handed process of aligning the hanger increases the time necessary to load cables over the thousands of feet of messenger wire with the hangers on 12 inch centers.

BRIEF SUMMARY OF THE INVENTION

This invention has to do with a gripping solar hanger for supporting cables and other wires that are to be hung along a linear path and conduct electrical power and signals. The invention comprises a cable hanger formed of a shape retention wire which may or may not have a coating formed on the shape retention wire. At least two upwardly opening cable support receptacles are formed with the shape retention wire with each receptacle having a trough area and lateral sides extending upwardly from each side of said trough area. Between the receptacles there is formed a space referred to as a fissure which may in some cases be upwardly opening with the fissure located intermediate of said receptacles and in some cases having a support abutment bottom. Support arms extend toward the center of the hanger from the two outermost, lateral receptacle sides and separate and co-operating gripping hooks are formed on inner distal ends of the support arms and extend toward one another. The hanger has a first uncompressed position with an opening between the gripper hooks and a second compressed state with the eyes of the gripper hooks aligned in a co-planar adjacent relationship so as to accommodate a messenger wire through both hooks. The eyes of said gripper hooks are sized so that whether coated or uncoated the eyes continually narrow toward the bend forming the hook so that the eyes will have a resilient interference fit with the intended support structure (the messenger wire). The shape retention wire is chosen from one of the group of mid to high tensile round galvanized steel, round stainless steel, flat rolled galvanized steel, flat rolled stainless steel, or aluminum. The shape retention wire may be bare or coated with a plastisol coating which at the present time has a thickness in the range of from 50 mil to 100 mils inches thick, although other thicknesses may be employed. Other coatings such as rubber or plastic based coating may also be utilized. The shape retention wire may also have a coating having a flame retardant, high dielectric grade, UV inhibited material.

The present invention also contemplates the method of hanging a cable from a carrier wire which comprises forming a shape retention wire so that it has at least two upwardly opening cable support receptacles with lateral sides. An intermediate fissure is then formed with lateral sides between two of the cable support receptacles with the lateral sides of the cable support receptacles forming the lateral sides of the fissure. Support arms are then formed that extend inwardly and upwardly from the hangers' outermost lateral sides and open eye-hooks are formed on the innermost ends of said arms such that in an uncompressed state of the shape retention wire the hooks have a spaced apart position relative to one another and in a compressed state the eyes of the hooks have aligned co-planar relationship with one another. The final step is coating the wire with a protective material of a thickness to provide the eye-hooks a gripping frictional fit with a support wire.

The solar gripping hanger system according to the present invention also includes the option of a total or partial coating of PVC, plastisol, or other style coating on the shape retention wire. The PVC coating is a high dielectric grade and flame retardant. The coating has UV inhibitors for the more demanding environments of solar power plants in desert locations and for improved performance and highly corrosive environments. The total PVC coating on the gripping solar cable hanger assembly provides additional corrosion resistance and protection of cables; it also adds stability by providing a more secure grip of the top attachment loops to the messenger wire. A totally PVC coated single or multiple gripping solar hanger assembly is also easier to handle and install with a heavy 50 to 100 mil inch thick PVC coating over the entire surface. The PVC coating is 50 to 100 mils inch thick which also has the added benefit of providing cushioning for the hands when squeezing installing the cable hanger on the messenger wire. This benefit improves efficiency by allowing more cable hangers to be installed and significantly reduces the fatigue factor of the hand.

Materials used for the cable hangers include high tensile spring steel such as class 3 galvanized steel, copper clad steel, type 316 stainless steel, aluminum, or other material with similar characteristics. All the materials above can be 0.100 to 0.250 inch diameter such as the high tensile spring steel, round or rolled flat wire form. These high quality materials provide maximum strength with a smooth, round or flat surface for the support of cables and rounded edges for the protection of cable jackets. The high tensile wire provides a tight gripping action on the messenger wire to hold the hanger securely.

OBJECTS OF THE INVENTION

It is an object of the present invention to provide a cable support system that can be easily installed and remain captive on the messenger wire during installation of cables thereby improving efficiency of labor in the solar, mining, and electrical industries.

It is the object of the present invention to provide a cable support system that maintains the position of the hanger at a specified spacing on the messenger wire to improve the quality and efficiency of cable installations.

It is an object of the present invention to provide a cable support system that will consistently maintain a cable hanger in the proper 90° orientation to the messenger wire for ease of loading cables and cable bundles by electricians.

It is an object of the present invention to provide a new safe and more efficient hanger system for the solar, mining, and electrical industries.

It is an object of the present invention to provide a new multiple cable hanger system for the solar, mining, and electrical industries.

It is an object of the present invention to provide a new hanger system that greatly reduces installation labor time for the solar, mining, and electrical industries.

It is a further object of the present invention to provide a more organized system to support cables in the solar, mining, and electrical industries.

It is a further object of the present invention to provide a cable support system that provides a safer, secure, strong, and effective separation of cables and wires so as to protect the electrical performance of cables in the solar, mining and electrical applications.

It is a further object of the present invention to provide a stronger, more corrosion resistant cable management system for the solar, mining, and electrical industries.

It is a further object of the present invention to provide a more flexible cable management system for multiple bundles of cables of different sizes for the solar, mining, and electrical Industries.

It is a further object of the present invention to provide a safer cable management system for communication, control and electrical cables for the solar, mining, and electrical industries.

It is a further object of the present invention to provide an inexpensive hanger for the solar, mining, and electrical industries.

BRIEF DESCRIPTION OF DRAWINGS

FIG. 2 is a top view of the coated gripper cable hanger according to the present invention.

FIG. 3 is a left side view of the coated gripper cable hanger according to the present invention.

FIG. 4 is a right side view of the coated gripper cable hanger according to the present invention.

FIG. 5 is a bottom view of the coated gripper cable hanger according to the present invention.

FIG. 12A is a cross-section taken on the line 13A-13A of FIG. 12.

FIG. 12B is a variation of FIG. 12A, depicting the flat wire as being coated.

FIG. 12C is a variation of FIG. 12A, depicting the flat wire as being plastic coated.

FIG. 12D is a variation of FIG. 12A, depicting the wire as being round and uncoated.

FIG. 12E is a variation of FIG. 12A, depicting the wire is being round and surface coated.

FIG. 12F is a variation of FIG. 12A, depicting the wire is being round and plastic coated.

FIG. 17 is an environmental perspective of the unit shown in FIG. 16, in use.

DETAILED DESCRIPTION OF DRAWING

Figure 1:
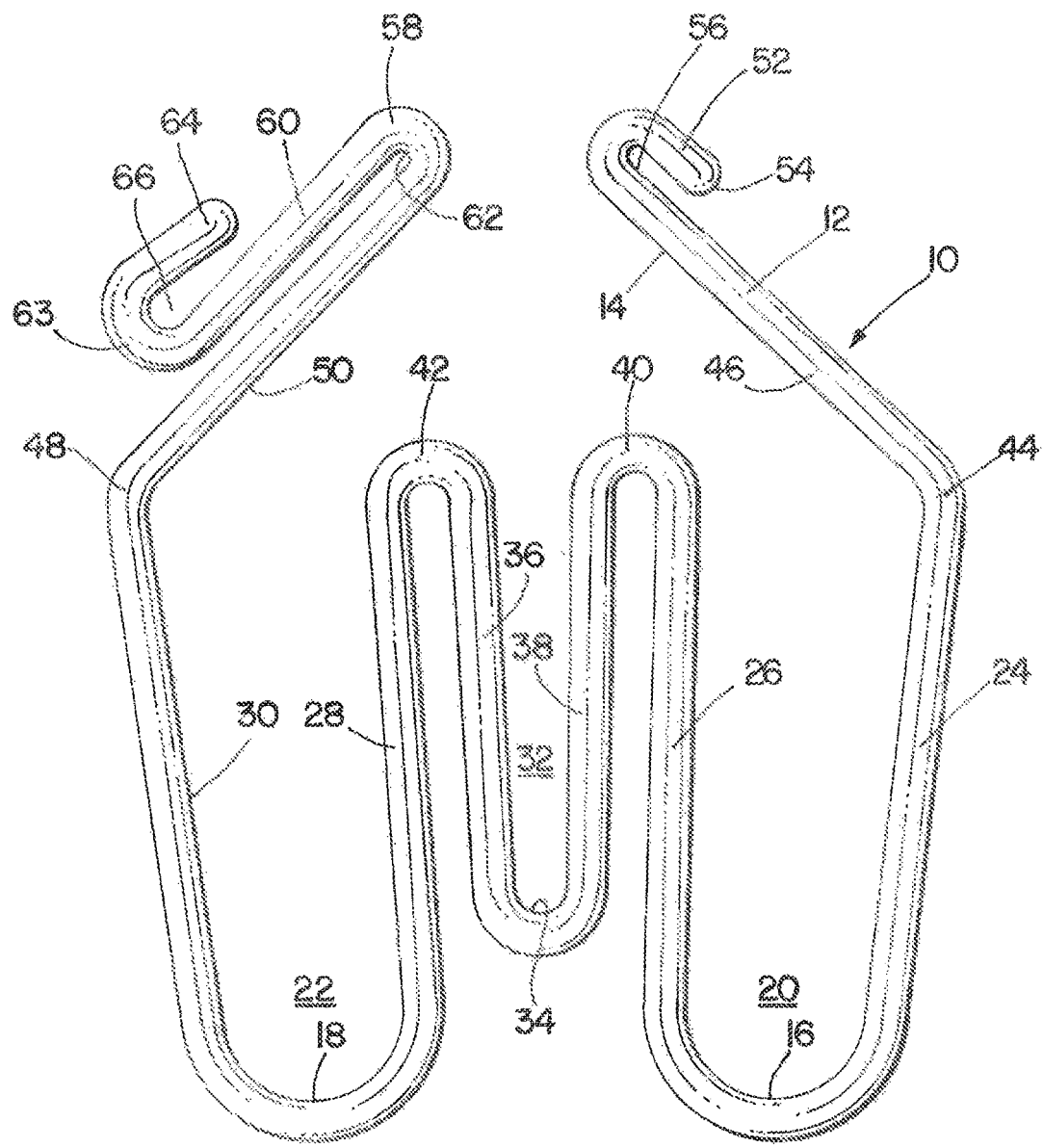
FIG. 1 is a front view of the coated gripper cable hanger according to the present invention.

What is shown in FIG. 1 is a front view of the coated gripper cable hanger 10 according to the present invention. The hanger 10 is comprised of a shape retention wire 12 that has a coating 14 adhered thereto. The gripping hanger 10 has at least two upwardly opening cable support receptacles shown in 16 and 18 with each having a trough area shown at 20 and 22.

Lateral sides 24 and 26 extend upwardly from the trough area shown at 20 to form the upwardly opening receptacle 16 and lateral sides 28 and 30 extend upwardly from the trough area 22 to form the upwardly opening receptacle shown at 18. A fissure 32 is formed having an abutment support surface 34 formed with upwardly extending lateral sides 36 and 38 with lateral side 38 having a juncture 40 with lateral side 26 and lateral side 36 having a juncture 42 with lateral side 28. At the top of the lateral side 24 there is a bend 44 that joins a first support arm 46 that extends towards the center of the hanger 10. On the opposite side of the hanger 10 is lateral side 30 which extends upwardly to a juncture 48 and adjoins a second support arm 50 that extends upwardly and towards the center of the hanger 10. At the central innermost end of first support arm 46 is a hook 52 formed by bending tip 54 of the shape retention wire 12 back along a line substantially parallel to the centerline of support arm 46. An eye 56 is then formed by hook 52 which will be sized so as to fit snugly around a support wire to be mentioned later. In a similar fashion, a hook 58 is formed by bending the tip 60 of the shape retention wire 12 backwards along the line substantially parallel to the centerline of second support arm 50. In this way eye 62 is formed that has a similar dimensions to eye 56. Tip 60 extends outwardly of the center of the hanger 10 until it forms a loop 63 by bending tip 64 of shape retention wire 12 back so that tip 64 points toward the center of hanger 10. The loop 63 has an eye 66 that will act as a support for a signal wire.

The eye at 66 is loose fitting which allows the signal wire to be slipped in and out of eye without interference. The hanger 10 shown in FIG. 1 is in an uncompressed state. "Uncompressed state" means that the outermost lateral sides 24 and 30 of the hanger 10 have no forces acting inwardly on them and hanger 10 is in a "free" state with hooks 56 and 58 separated from one another and the shape retention wire 12 is in its natural state to which it will try and return when no forces are acting on it. The hanger 10 is made, and sometimes sized, so that a person may squeeze the outermost lateral sides 24 and 30 towards one another in such a manner to make the eye 56 of hook 52 line up with the eye 62 of hook 58 around a support wire with the shape retention feature of wire 12 providing an expansion force when released to hold the hooks 52 and 58 securely in place on a support wire. An operator using the hanger 10 will first place hook 58 around a support wire. This hook 58 has a tight friction fit hook eye 62 to hold it from moving on the support wire 78 while being loaded. The hook 58 has the extension so as to stay in place during loading and so it is usually installed first on the support wire. While the hanger 10 is supported by hook 58 on a support wire, cables 74 and 76 may be loaded into the upwardly opening receptacle 16 and 18 so that the cable's rest on the troughs 16 and 18 and electrical cables such as 74 and 76 may be strung down through the fissure 32 and rest on the abutment support surface at 34. With the cables and electrical wire bus loaded onto the hanger 10 the outwardly lateral sides 24 and 30 of hanger 10 may be squeezed together so that the second of the hooks 52 may engage around a support wire and then be left to expand so that the hooks 52 and 58 firmly secure the hanger 10 on a support wire. A feature of the hanger 10 is that the eye 56 of hook 52 and eye 62 of hook 58 are coated in such a manner that there is an interference or friction fit with the support wire (not shown).

Figure 1A:
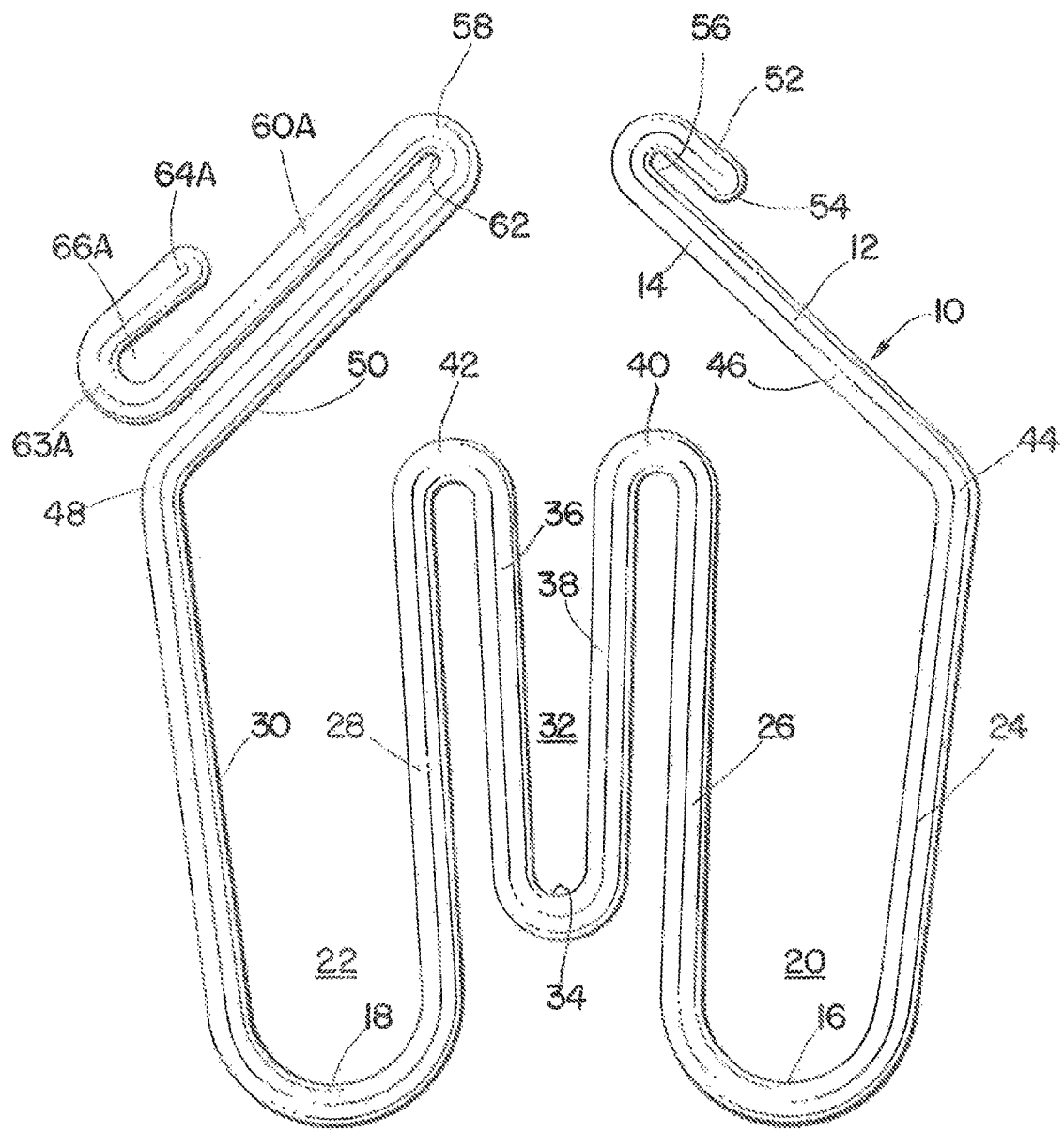
FIG. 1A is a front view of a modified cable hanger shown in FIG. 1.

What is shown in FIG. 1A is the same hanger as is shown in FIG. 1 but with the alternative configuration of having an elongated tip 60 now shown as 60A with associated tip 64A, bend 63A and eye 66A.

What is shown in FIG. 2 is a top view of the coated gripper cable hanger 10 according to the present invention. On the one side of gripper cable hanger 10 is shown the tip 64 on the tip 60 which is on the upper part 58 on arm 50 (not shown). Shown in the middle of gripper hanger 10 in FIG. 2 are portions of the junctures 42 and 40 shown adjacent to the abutment surface 34 at the bottom of fissure 32 shown in FIG. 1. On the right-hand side of FIG. 2 is shown a support arm 46 that extends inwardly from the lateral side 24 shown in FIG. 1. What is shown in FIG. 3 is a left side view of the coated gripper cable hanger 10 according to the present invention. Gripper cable hanger 10 is shown with tip 64 formed on tip 60 which itself is the tip of support arm 50 shown in FIG. 1 with its lateral side 30 shown extending to the lowermost portion of hanger 10.

What is shown in FIG. 4 is a right side view of the coated gripper cable hanger 10 according to the present invention. Gripper cable hanger 10 is shown with the tip 52 forming a part of the eye 56 shown in FIG. 1. Lateral side 24 is shown with bend 44 joining the support arm 46 that extends towards the center of the gripper hanger 10.

What is shown in FIG. 5 is a bottom view of the coated gripper cable hanger 10 according to the present invention.

Gripper cable hanger 10 is shown having a wire bend 68 forming the bottom of "upwardly" opening receptacle 18 shown in FIG. 1 and 70 being the bottom bend forming the upwardly facing receptacle 16 shown in FIG. 1; a bottom bend 72 forms the abutment surface for abutment surface 34 shown in FIG. 1.

Figure 6:
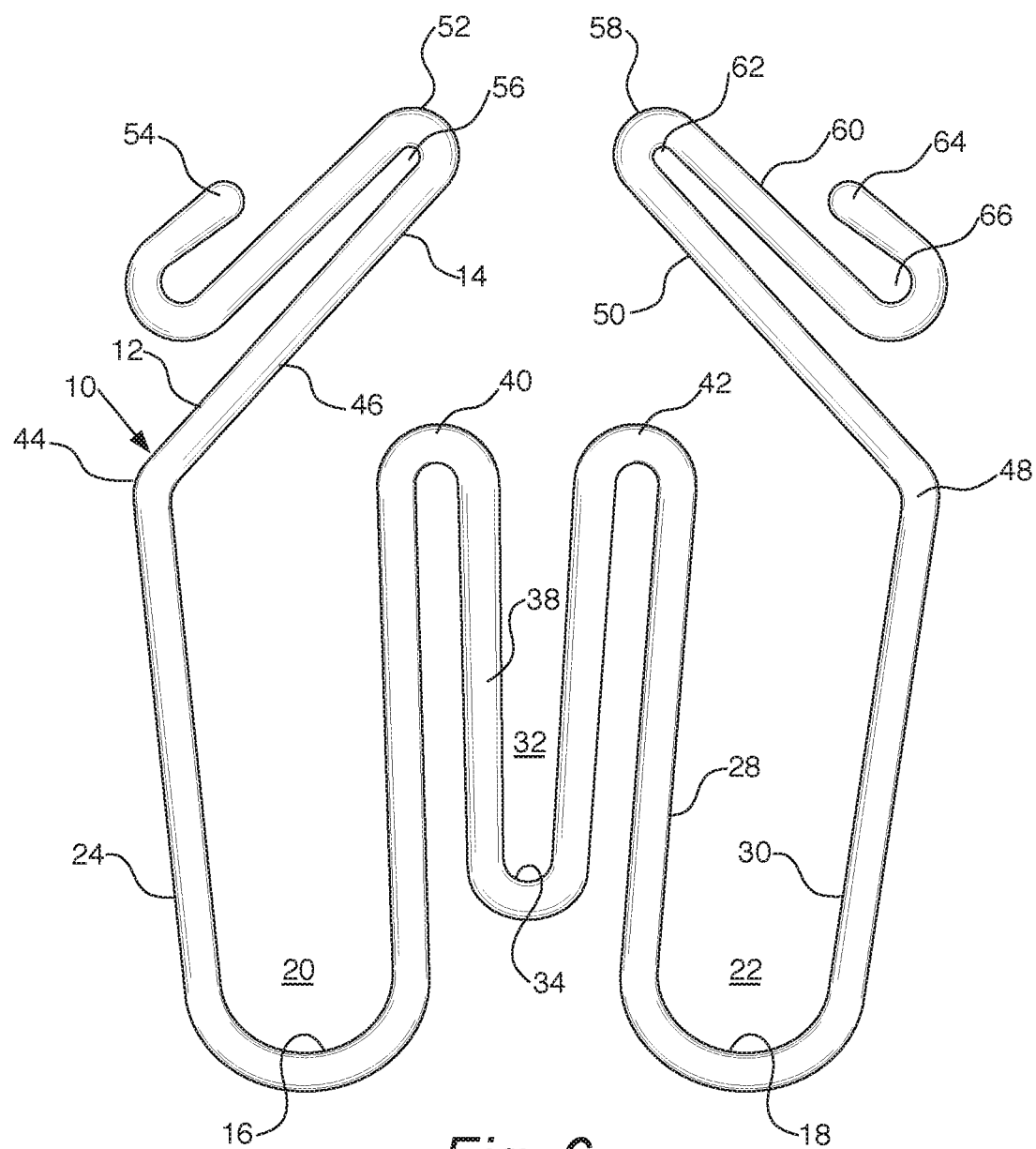
FIG. 6 is a rearview of the coated gripper cable hanger according to the present invention.

What is shown in FIG. 6 is a rear view of the coated gripper cable hanger 10 according to the present invention having all the features as shown and described in FIG. 1.

Figure 7:
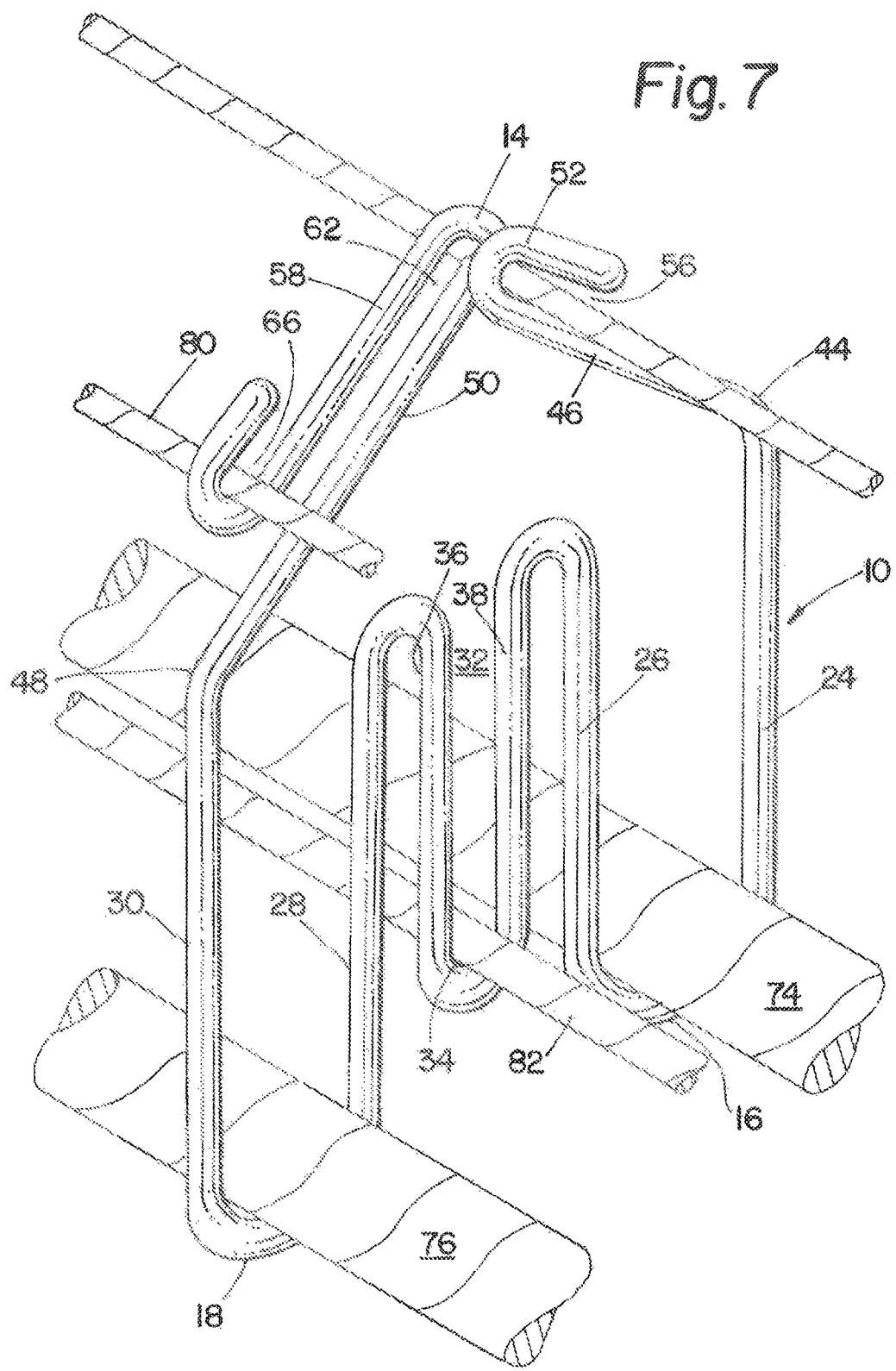
FIG. 7 is an environmental perspective of the coated gripper cable hanger.

What is shown in FIG. 7 is an environmental perspective of the coated gripper cable hanger 10 according to the present invention. The hanger 10 is shown supporting cables 74 and 76 while hung on a messenger wire 78. A signal wire 80 is shown carried in the eye 66 of the loop 63 and a third cable 82 is shown carried on the abutment support surface 34 and is spaced a required distance from cables 74 and 76 so as not to interfere with the electronic transmissions. The upwardly opening receptacle 16 with lateral sides 24 and 26 is shown; supporting cables 74 lateral side 24 extends upward to the bend 44 joins lateral side 24 to the inwardly extending support arm 46 on the end of support arm 46 is a hook 52 which has eye 56 that grips the messenger wire 78. The eye 56, along with the chosen coating 14 thereon, forms a friction fit with the diameter of the messenger wire 78 so as to resist the eye 56 from slipping one way or the other down the messenger wire 78. On the other side of the gripper hanger 10 is shown the upwardly opening receptacle 18 having lateral sides 28 and 30 surrounding and supporting the cables 76. The lateral side 30 extends upwardly to the bend at 48 which joins the arm 50 with lateral side 30. Support arm 50 is shown with eye 62 formed on hook 58. The eye 62 of the hook 58 has a coating 14 thereon such that it also forms a frictional fit with the diameter of the guy wire 78 to resist the hook 58 from sliding back and forth along the length of the guy wire 78. FIG. 7 also shows the eye 66 of the loop 63 that carries the signal wire 80 on the hanger 10. Shown between the upwardly opening receptacle 16 and 18 is a fissure 32 having lateral sides 36 and 38 forming at the bottom and abutment support surface 34 for supporting the cable 82. It should be noted that in its natural state the gripper hanger 10 is shown in FIG. 1 with the hooks 52 and 58 separated by a spaced apart distance to engage the gripper hanger 10 with the messenger wire 78 and the operator may grip one of the lateral sides 24 or 30 and engage eye 62 of hook 58 with the messenger wire 78. Once the eye 62 of hook 58 is engaged with the messenger wire 78 lateral side 24 and therefore support arm 46 may be compressed until hook 52 is passed under the messenger wire 78 and is able to be rotated upwards so that when the gripper hanger 10 is released when the lateral sides 24 and 30 of the gripper hanger 10 are released, hook 52 will then engage the messenger wire 78. At this point, the eyes 62 of hook 58 and the eye 56 of hook 52 will be in a coplanar alignment with both hooks fractionally gripping the messenger wire 78 and the normal expansion force of the shape retention wire 12 will act to hold the hooks 52 and 58 in place until manually disengaged.

Figure 8:
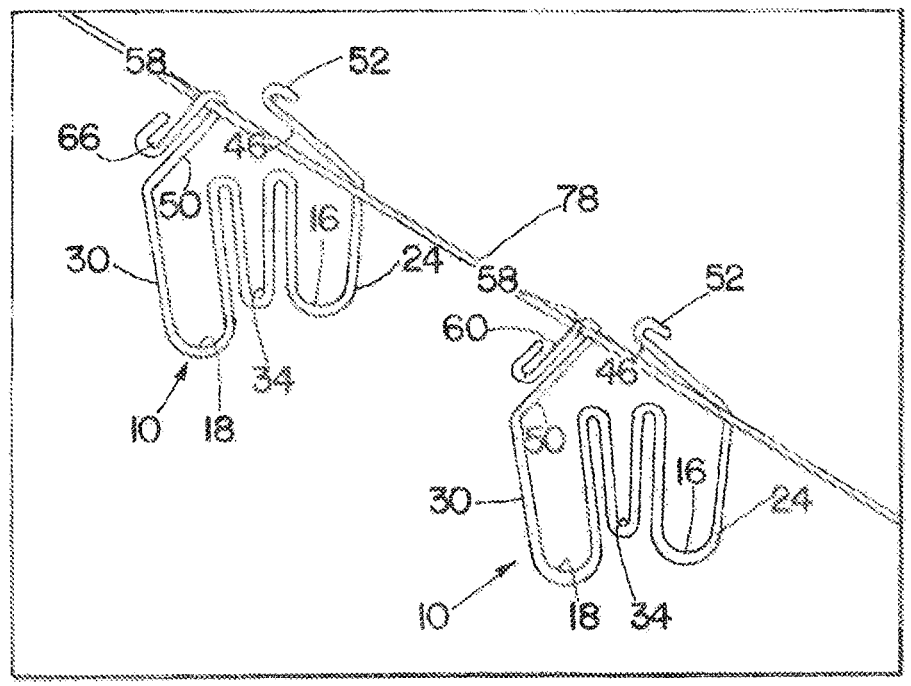
FIG. 8 is an environmental perspective of the present hanger as applied to a messenger wire.

What is shown in FIG. 8 is an environmental perspective of the present hanger 10 as applied to a telephone or messenger wire or cable 78. The gripper hanger 10 is shown attached the messenger wire 78 by a hook 58 on the support arm 50. A second gripper hanger 10 is also shown attached to messenger wire 78 in the same fashion, but as shown in FIG. 8, the lateral sides 24 and 30 of gripper hanger 10 have not yet been compressed and the hooks 58 can first engage the messenger wire 78. The method of stringing the cables 74, 76, 80 and 82 shown in FIG. 7 is partially shown in FIGS. 8 and 9. Multiple gripper hangers 10 are placed in their open position as shown in FIG. 8 at spaced apart distances along the messenger wire 78. The operator may then string the cables 74, 76, or 82 by bringing the cables lengthwise along the length of the messenger wire 78 and placing the respective cables 74, 76 and 82 in their respective upwardly facing receptacles 16 or 18 and the abutment support surface 34.

Figure 9:
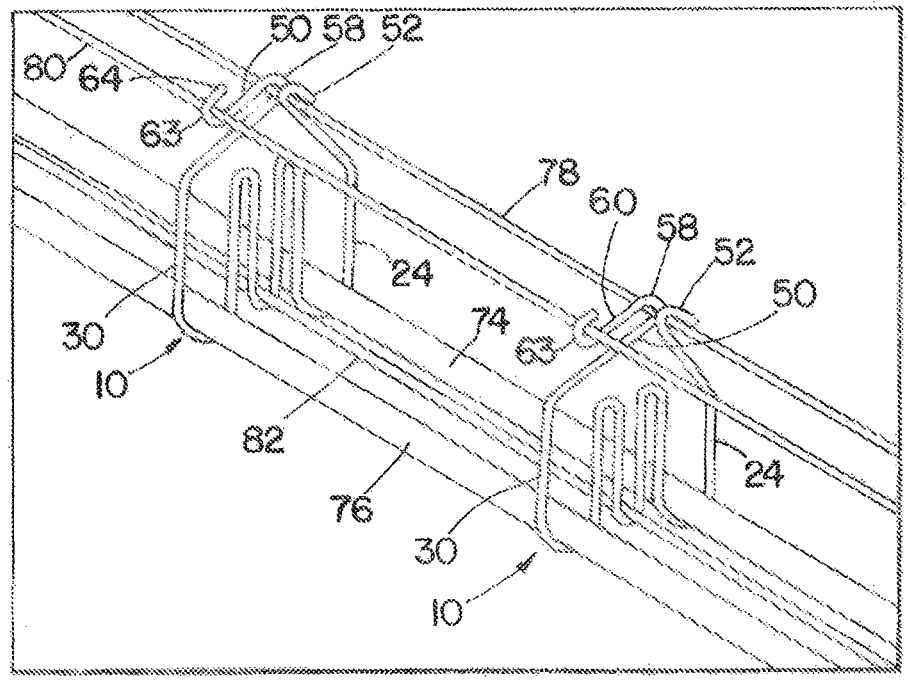
FIG. 9 is an environmental perspective view of the cable hanger in use.

What is shown in FIG. 9 is an environmental perspective view of the gripper hanger 10 showing its second closed position after loading the cables 74, 76, and 82 as described in FIG. 8. The gripper hangers 10 are shown having the lateral sides 24 and 30 compressed so that the hooks 52 and 58 are engaged with the messenger wire 78 and hold the gripper hangers 10 in a closed position supporting cables 74, 76 and 82. A signal wire 80 is shown as being strung along the length of the messenger wire 78 by going through the loop 63 on hook 58 of arm 50.

Figure 10:
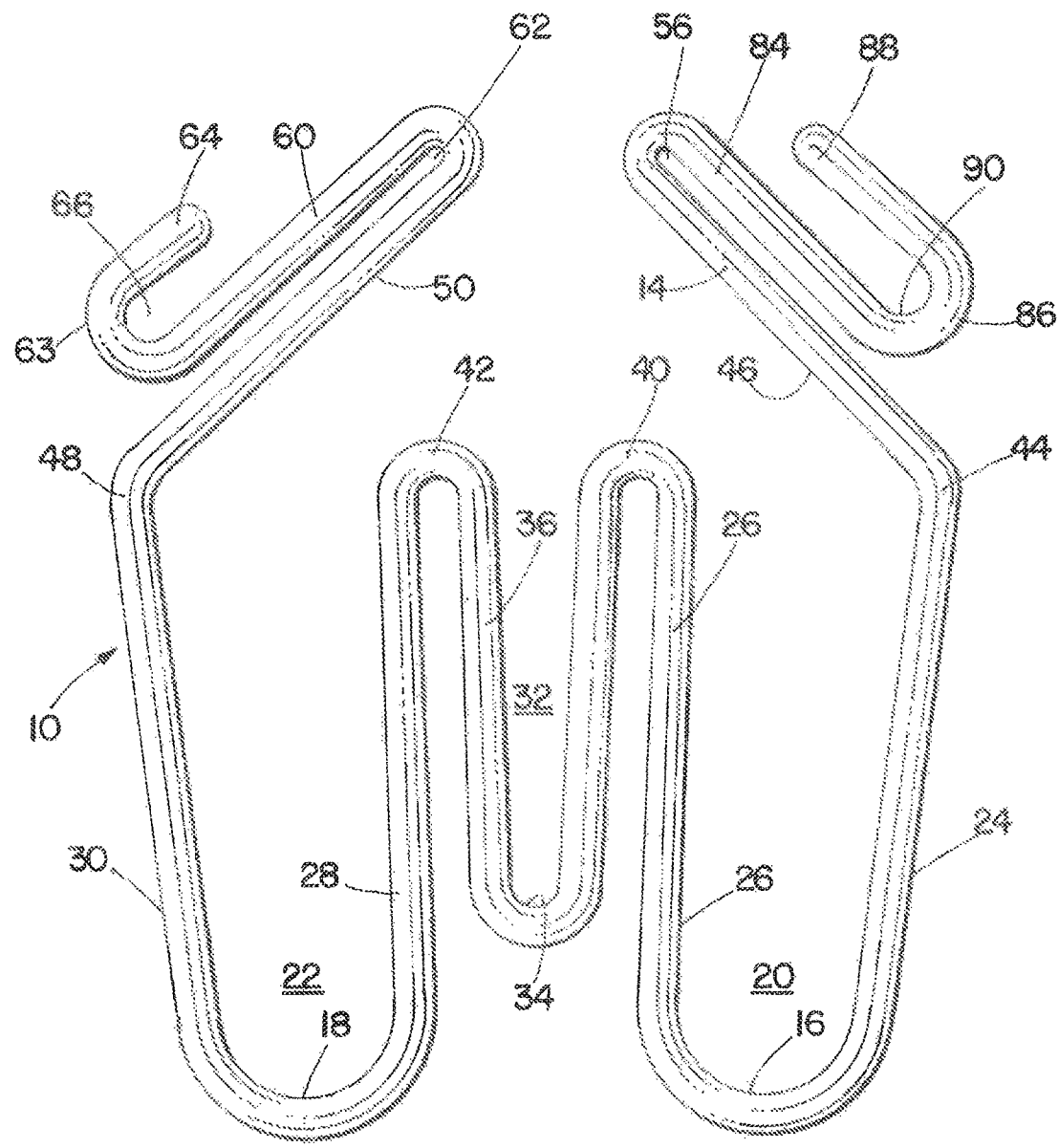
FIG. 10 is a front view of an alternative embodiment of the present invention.

What is shown in FIG. 10 is a front view of an alternative embodiment of the gripper hanger 10 according to the present invention. In this embodiment all the features described in FIG. 1 stay the same except for the original hook 52 and its tip 54. Tip 52 is now been elongated and designated as 84 and has a bend 86. The bend 86 is now provided with a longer length than the original hook 52 until it forms another bend 86 having a tip 88 formed thereon and a further receptacle 90 is now formed by the bend 86. A further cable 92 is shown being supported by the bend 86 in FIG. 11.

Figure 11:
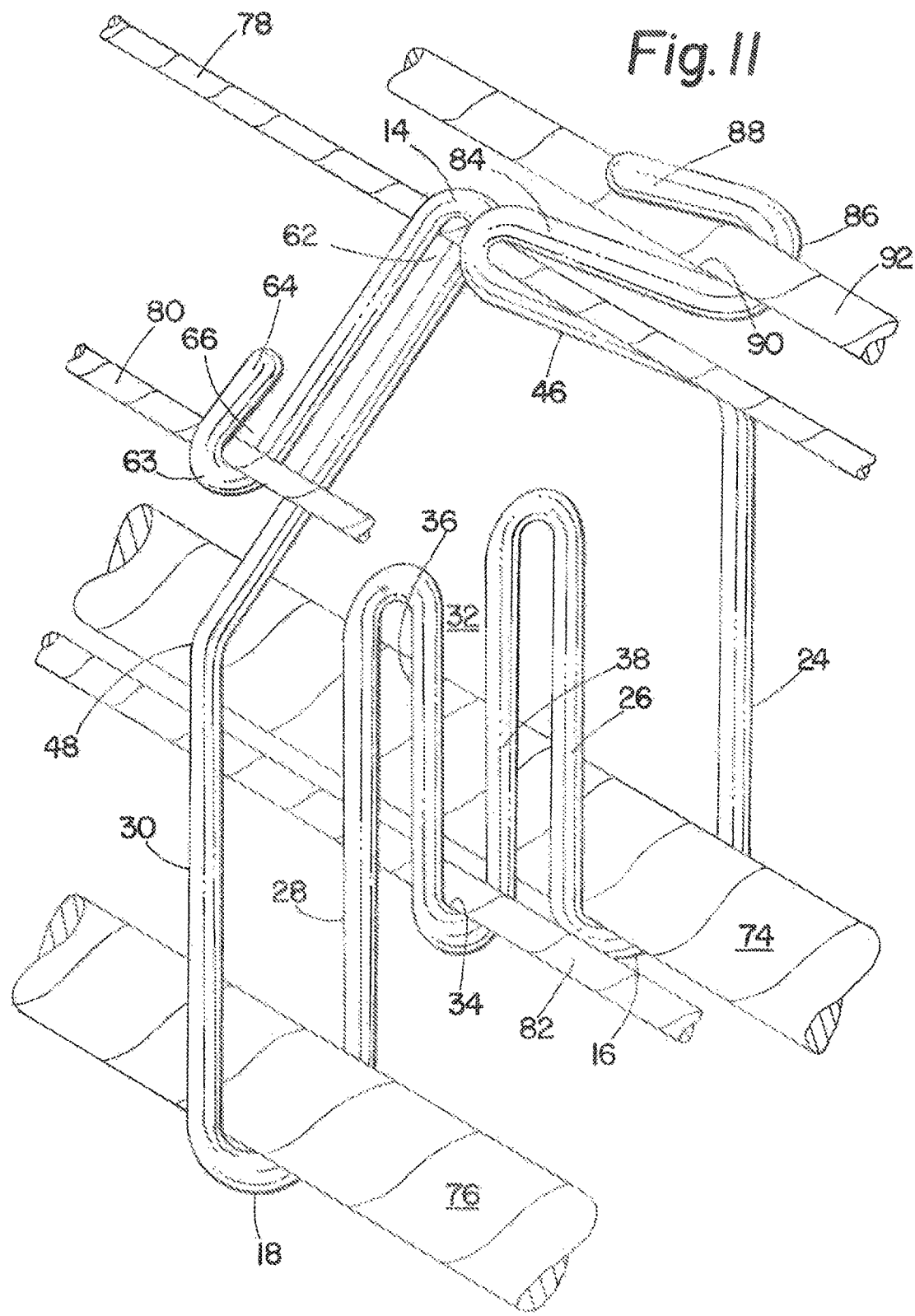
FIG. 11 is an environmental perspective of the alternative cable shown in FIG. 10.

What is shown in FIG. 11 is an environmental perspective of the alternative gripper cable 10 shown in FIG. 10. The features of the gripper cable 10 are the same as shown in FIGS. 1 and 7 except for an additional cable 92 shown being carried in the receptacle 90.

Figure 12:
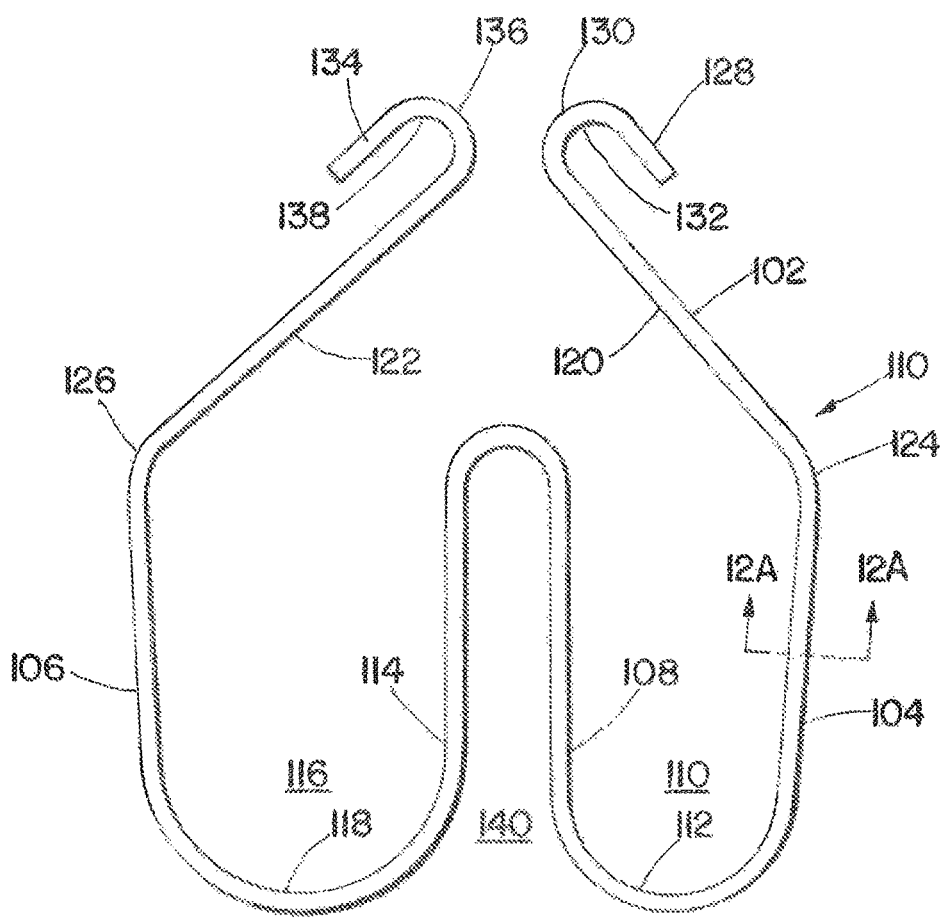
FIG. 12 is a front view of a second alternative embodiment of the present invention, uncoated.

What is shown in FIG. 12 is a front view of an alternative embodiment of the present invention in a gripper hanger 100. The gripper hanger 100 is formed of a flat rolled, shape retention wire 102 and has outer lateral sides 104 and 106. Lateral side 104 has a corresponding inner lateral side 108 to form an upwardly facing cable receptacle 110 having an abutment support surface 112 on the bottom thereof for supporting a cable. Gripper hanger 100 has an inner lateral side 114 corresponding with the outer lateral side 106 to form an upward facing cable receptacle 116 with a cable support surface 118 for supporting a cable. The gripper hanger 100 has support arms 120 and 122 extending inwardly toward the center of the hanger 100 from the outer lateral sides 104 and 106 respectively. Support arm 120 joins the outer lateral side 104 by bend 124 and the inwardly extending arm support arm 122 joins the lateral outer lateral side 106 at bend 126. On the innermost end of support arm 120 is found hook 128 formed by a bend 130 in the support arm 120 and having an eye 132 in the hook 128 for gripping a messenger wire 78 (not shown). On the opposite side of gripper hanger 100 is the support arm 122, having a hook 134 formed on its innermost end by bend 136 formed in the shape retention wire 102. Hook 134 has an eye 138 for gripping a messenger wire 78 (not shown). The solar gripper hanger 100 has multiple cable receptacles 110 and 116 and provides a required spaced apart condition shown at 140 in FIG. 12.

What is shown in FIG. 12A is a cross-section taken on the line 12A-12A of FIG. 12. Shape retention wire 100 is shown as uncoated. What is shown in FIG. 12B is a permutation of FIG. 12A, depicting the flat wire as being coated. Shape retention wire 100 is shown as having a coating 142 covering the shape retention wire 102.

What is shown in FIG. 12C is a permutation of FIG. 12A, depicting the flat shape retention wire 102 as having a plastic coating 144.

What is shown in FIG. 12D is a permutation of FIG. 12A, depicting the shape retention wire 102 as being round and uncoated.

What is shown in FIG. 12E is a permutation of FIG. 12A, depicting the shape retention wire 102 as being round and 142 surface coated.

What is shown in FIG. 12F is a permutation of FIG. 12A, depicting the shape retention wire 102 as being round and 144 plastic coated.

Figure 13:
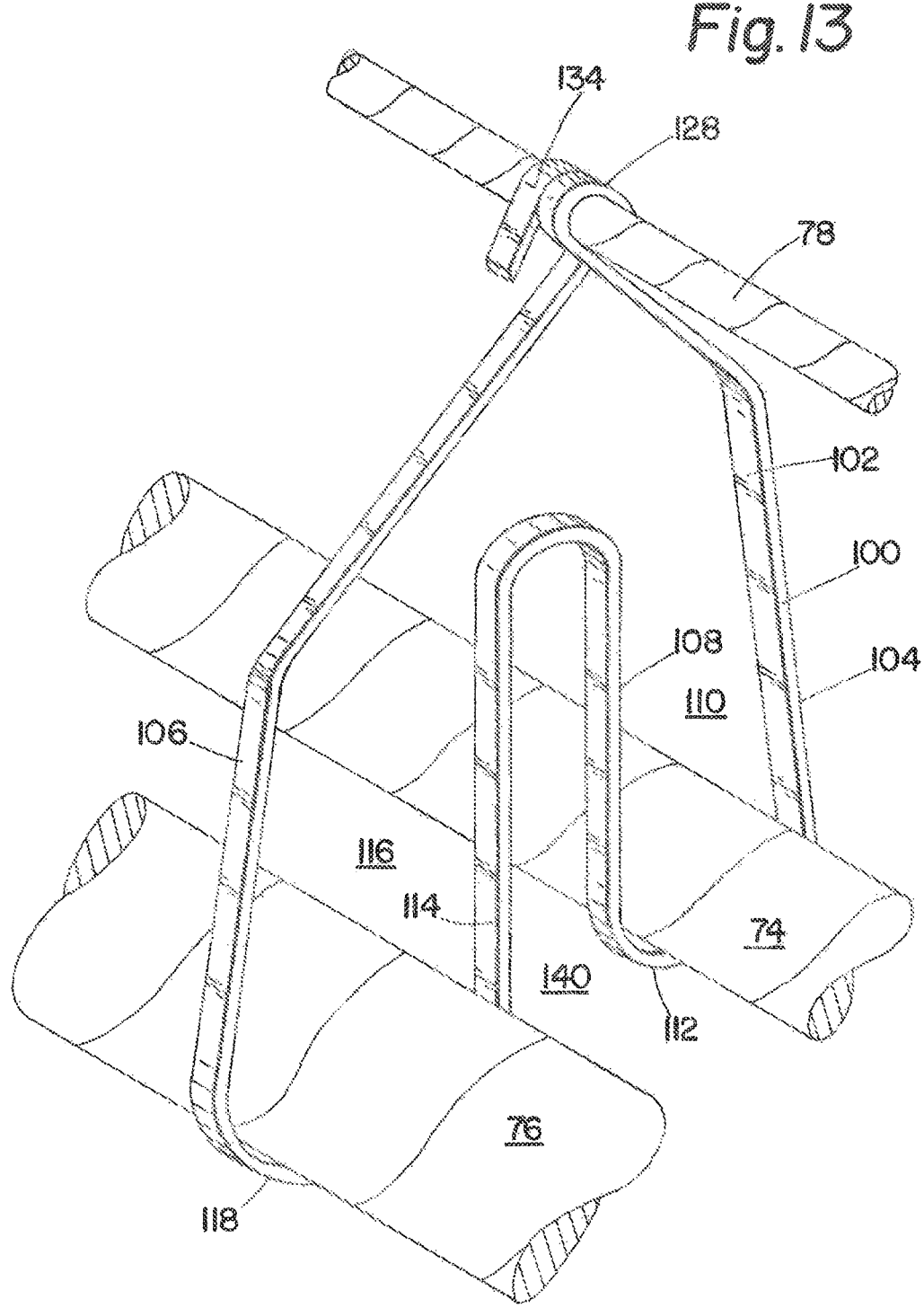
FIG. 13 is an environmental perspective of the alternative cable shown in FIG. 12, in use.

What is shown in FIG. 13 is an environmental perspective of the alternative solar gripper hanger 100 shown in FIG. 12. Messenger wire 78 is shown having gripper cable hanger 100 attached thereto. In solar gripper hanger 100 is shown attached to the messenger wire 78. The upward facing receptacles 110 and 116 have cables 74 and 76 resting therein and supported by the abutment surfaces 112 and 118; the upward facing receptacles 110 has lateral sides 104 and 108 and the upwardly facing receptacle 116 has sides 114 and 106. The outer lateral sides 104 and 106 were compressed together so that the hooks 128 and 134 could grasp the messenger wire 78 and grip it firmly to hold it from sliding lengthwise along the messenger wire 78. The method of loading the cables would, of course, entail first attaching solar gripper hanger 100 by either one of hooks 128 or 134 and leaving the gripper hanger 100 in an open position. While in this position, cables 74 and 76 can begin to be loaded into the upwardly facing receptacles 110 and 116. When the cables 74 and 76 are so loaded an operator may grip the outer lateral sides 104 and 106 of solar gripper hanger 100 and squeeze so that the unengaged hook 128 or 134 so that it passes under the messenger wire 78, at which point it may be then rotated so that when the operator releases the tension on the shape retention wire 102 that the unengaged hook 128 or 134 will spring into place and engage the messenger wire 78. With the solar gripper hanger 100, a spaced apart distance 140 is provided between the cables 74 and 76.

Figure 14:
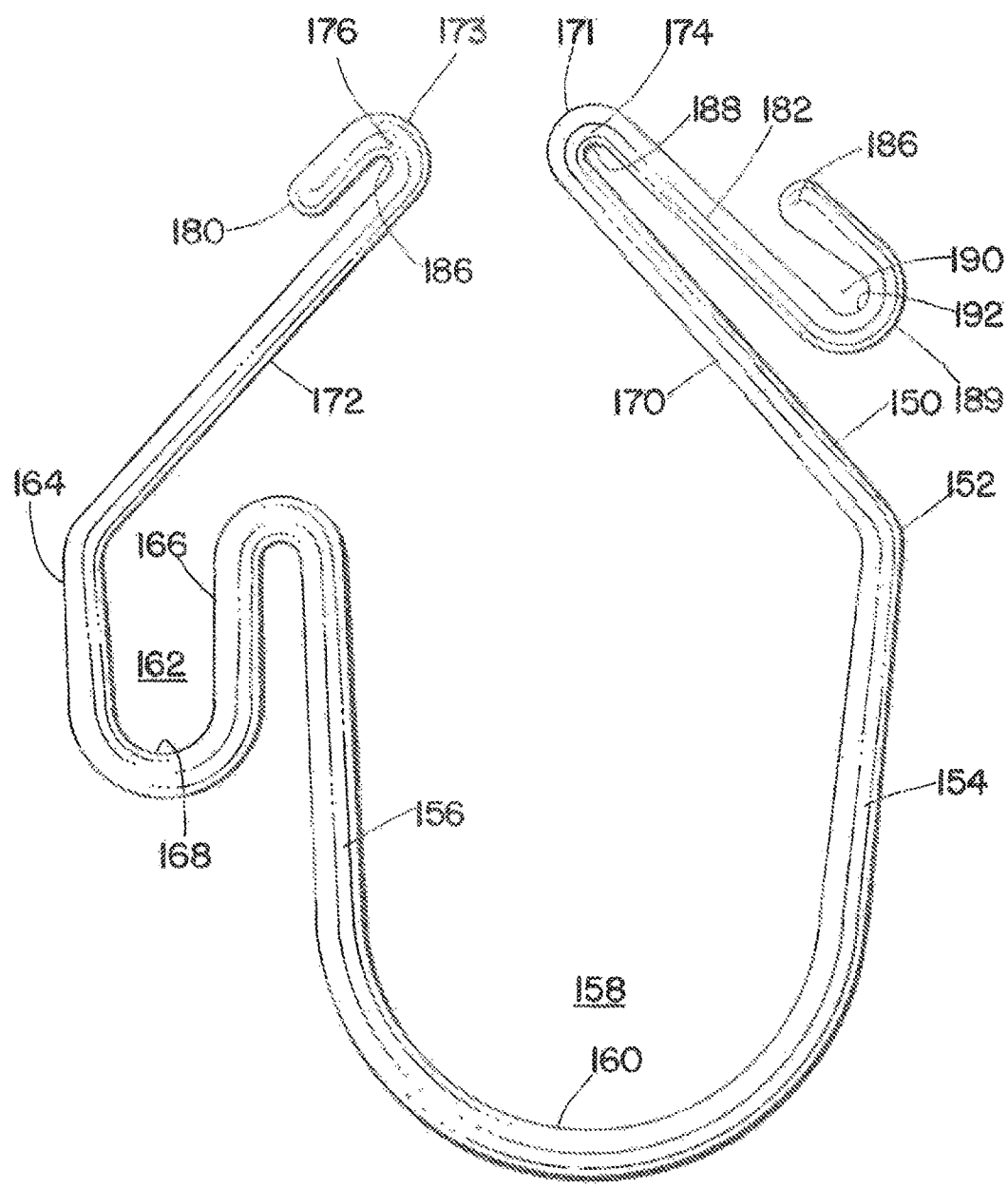
FIG. 14 is a front view of a third alternative embodiment according to the present invention.

What is shown in FIG. 14 is a front view of another alternative embodiment of the solar gripper hanger according to the present invention. Shown in FIG. 14 is solar gripper hanger 150 formed of a shape retention wire 152 and having an outer lateral side 154 and an opposite lateral side 156 that forms an upwardly facing receptacle 158 having a bottom support surface 160. In addition to the upwardly facing receptacle 158, the solar gripper hanger 150 has a second upwardly facing receptacle 162 that has an outer lateral side 164 and an inner lateral side 166, with a bend in the bottom forming a cable support surface 168. Extending inwardly from the lateral sides 154 and 164 of the solar gripper hanger 150 are support arms 170 and 172 that at their innermost ends have bends 171 and 173. The bend 171 forms a hook formation 174 and the bend 173 forms a hook formation 176 with hook 176 having a tip 180 formed thereon. The hook 174 has an extension 182 that extends down to a bend 184 and bends backward to a tip 186. As can be seen, the hook 176 has an eye 186 and the hook 174 has a hook 188 for engaging a messenger wire (not shown). The bend at 184 provides the cable receptacle area 190 and a cable abutment surface 192 for carrying even further cables on the solar gripper hanger 150.

Figure 15:
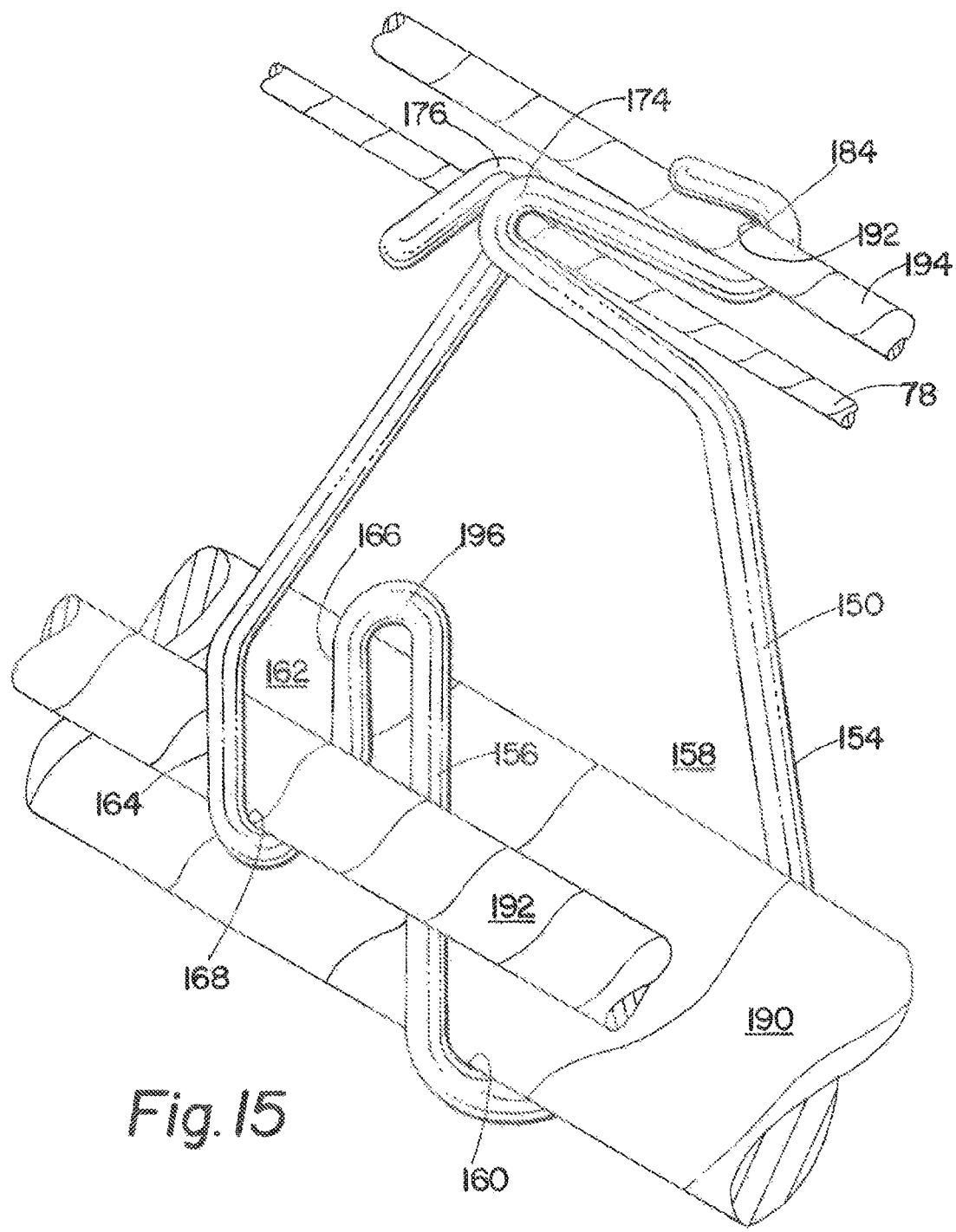
FIG. 15 is an environmental perspective of the hanger depicted in FIG. 14, in use.

What is shown in FIG. 15 is an environmental perspective of the solar gripping hanger 150 depicted in FIG. 14. The solar gripper hanger 150 is shown in supporting cables 190, 192 and a signal wire 194. The gripping solar hanger 150, as shown in FIG. 14, has lateral sides 154 and 156 forming an upwardly facing receptacle 158 with a support surface 160 on the bottom of the upwardly facing receptacle 158. Gripping solar hanger 150 has a bend 196 that joins the lateral side 156 of upwardly facing receptacle 158 to the lateral side 166 of the upwardly facing receptacle 162. The upwardly facing receptacle 162 has lateral sides 164 and 166 with a bottom support surface at 168 for supporting the cable 192. The bend at 196 is fashioned to provide a correct separation between the cable receptacles 158 and 162 as required by the federal standards. The hooks 174 and 176 are shown engaged with the messenger wire 78 and the bend 184 is shown providing the support surface 192 for the cable 194.

Figure 16:
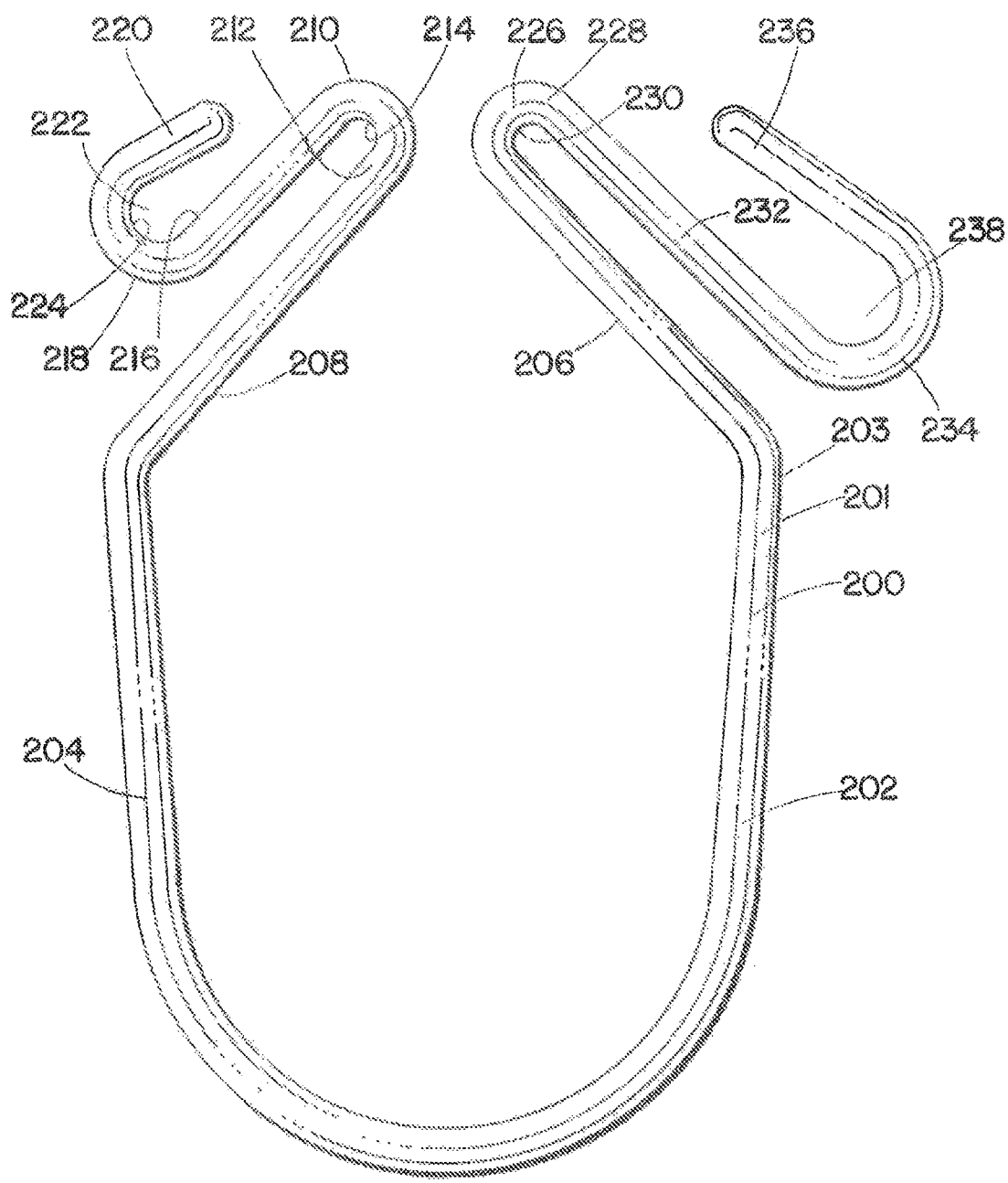
FIG. 16 is a front view of a fourth alternative embodiment of the present invention.

What is shown in FIG. 16 is a front view of another alternative embodiment of a gripping solar hanger 200 according to the present invention. The gripping solar hanger 200 has a lateral side 202 and a lateral side 204. The hanger 200 is made from a shape retention wire 201 that is coated with a coating 203. The lateral sides 202 and 204 are each showing inwardly extending arms 206 and 208, respectively, with the inwardly extending support arm 206 coming from the lateral side 202 and the inwardly extending support arm 208 coming from the lateral side 204. The inwardly extending arm 208 terminates with the bend 210 in the shape retention wire 201 and forms the hook 212 having the eye 214 of hook 212 formed therein. The bend 210 provides hook 212 with an outwardly extending portion 216 that has a further bend 218 and a tip 220. The bend 218 forms a further cable receptacle area at 222 with a cable support surface at 224. On the other side of the hanger the inwardly extending support arm 206 has a reverse bend 226 in the shape retention wire 201 to form a hook 228 having an eye 230 for gripping a support wire or messenger wire. The bend 226 then has an outwardly extending portion 232 that extends out to a further bend 234 which provides an inwardly extending tip 236. The bend at 234 provides a cable support area 238 between the outwardly extending portion 232 and the tip 236. What is shown in FIG. 17 is an environmental perspective of the solar gripping hanger 200 according to the present invention and as shown in FIG. 16. The solar gripping hanger 200 is shown with supporting multiple cables 240, 242 and 244. It is possible a cable 242 or 244 may be a signal wire instead of an actual cable. The gripping solar hanger 200 has a lateral sides 202 and 204 compressed so that the hooks 212 and 228 are engaged with the messenger wire 78 with the eyes 214 and 230 gripping the messenger wire firmly. The gripping solar hanger 200 is shown in its compressed state with the shape retention wire 201 wanting to expand the lateral sides 202 and 204 outwardly and thereby clamping the cable support hanger 200 firmly on the messenger wire 78.

The invention claimed is:
1. A cable hanger arrangement comprising:
   a messenger wire; and
   a number of cable hangers fit on the messenger wire via an interference fit, each cable hanger comprising:
      a shape retention wire;
      an upwardly opening cable support receptacle having a trough area and lateral sides extending upwardly from each side of said trough area;
      a support arm extending toward the center of the hanger from each receptacle lateral side; and
      a separate and co-operating hook formed on each said support arm,
   wherein each hanger has a first uncompressed state with an opening between said hooks and a second com- pressed state wherein said hooks are aligned in a co-planar adjacent relationship, and wherein each hook of each hanger is sized to have an interference fit with the messenger wire prior to being fit on the messenger wire.

2. The cable hanger according to claim 1 wherein said wire is chosen from the group of round galvanized steel, round stainless steel, flat rolled galvanized steel, flat rolled stainless steel, round aluminum, and flat aluminum.

3. The cable hanger according to claim 1 wherein a coating is disposed on said wire.

4. The cable hanger according to claim 3 wherein a PVC coating is disposed on said wire.

5. The cable hanger according to claim 3 wherein said coating is at least one of: a flame retardant coating, a high dielectric grade coating, or a UV inhibiting material.

6. A cable hanger comprising:
a shape retention wire;
at least two upwardly opening cable support receptacles with each having a trough area and an outermost lateral side extending upwardly from one side of said trough area;
a support arm extending toward the center of the hanger from each outermost lateral receptacle side;
separate and co-operating hooks formed on each said support arm;
said hanger having a first uncompressed state with an opening between said hooks and a second compressed state wherein said hooks are aligned; and
each said hook continually narrows toward the bend forming said hook.

7. The cable hanger according to claim 6 wherein each said hook is structured to have a frictional fit with a messenger wire.

8. The cable hanger according to claim 6 wherein said coating is a plastisol coating.

9. The cable hanger according to claim 6 wherein said coating is a PVC coating.

10. The cable hanger according to claim 6 wherein said coating is at least one of a flame retardant coating, a high dielectric grade coating, or a UV inhibiting material.

11. A cable hanger comprising:
a shape retention wire;
an upwardly opening cable support receptacle having a trough area and lateral sides extending upwardly from each side of said trough area;
a support arm extending toward the center of the hanger from said receptacle;
separate and co-operating hooks formed on each of said support arms, said hooks extending toward one another;
the hooks defining eyes;
said hanger having a first uncompressed state with an opening between said hooks and a second compressed state with the eyes of the hooks aligned in a co-planar adjacent relationship; and
the eyes of said hooks continually narrow toward the bend forming the hook.

12. The cable hanger according to claim 11 wherein said wire from a group of round galvanized steel, round stainless steel, flat rolled galvanized steel, or flat rolled stainless steel.

13. The cable hanger according to claim 11 wherein a plastisol coating is disposed on said wire.

14. The cable hanger according to claim 11 wherein a PVC coating is disposed on said wire.

15. The cable hanger according to claim 11 wherein:
a coating is disposed on said wire; and
said coating is at least one of a flame retardant coating, high dielectric grade coating, or a UV inhibiting material.

16. A method of organizing a number of cables about a messenger wire, the method comprising:
fitting, with an interference fit, a number of cable hangers to the messenger wire, each cable hanger comprising:
a shape retention wire;
an upwardly opening cable support receptacle having a trough area and lateral sides extending upwardly from each side of said trough area;
a support arm extending toward the center of the hanger from each receptacle lateral side;
a separate and co-operating hook formed on each said support arm,
wherein each hanger has a first uncompressed state with an opening between said hooks and a second compressed state wherein said hooks are aligned in a co-planar adjacent relationship, and
wherein each hook of each hanger is sized to have the interference fit with the messenger wire prior to being fit to the messenger wire; and
positioning at least one cable of the number of cables in the cable support receptacle of at least one hanger of the number of cable hangers after the at least one hanger has been fit to the messenger wire.

* * * * *